G. A. RAPP.
HAY PRESS.
APPLICATION FILED MAY 18, 1907.
900,588.
Patented Oct. 6, 1908.
3 SHEETS—SHEET 2.
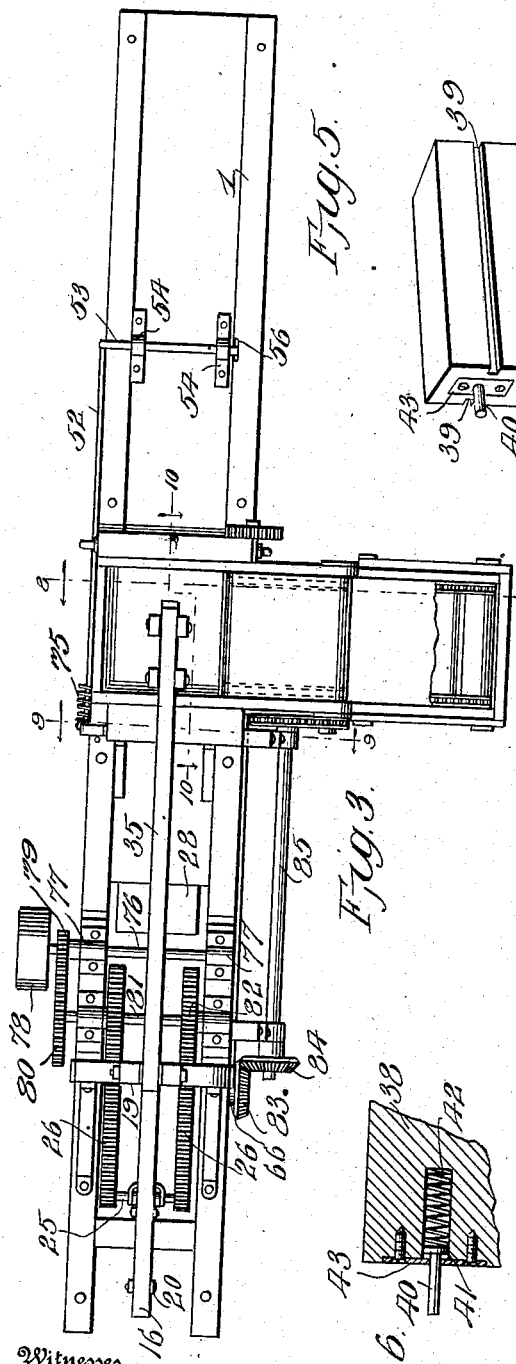
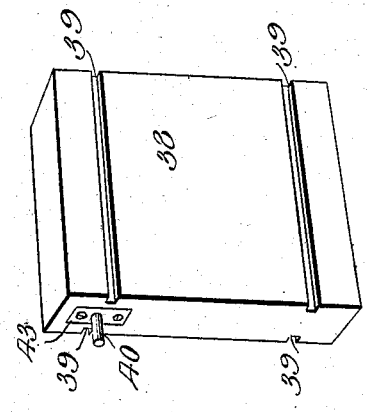
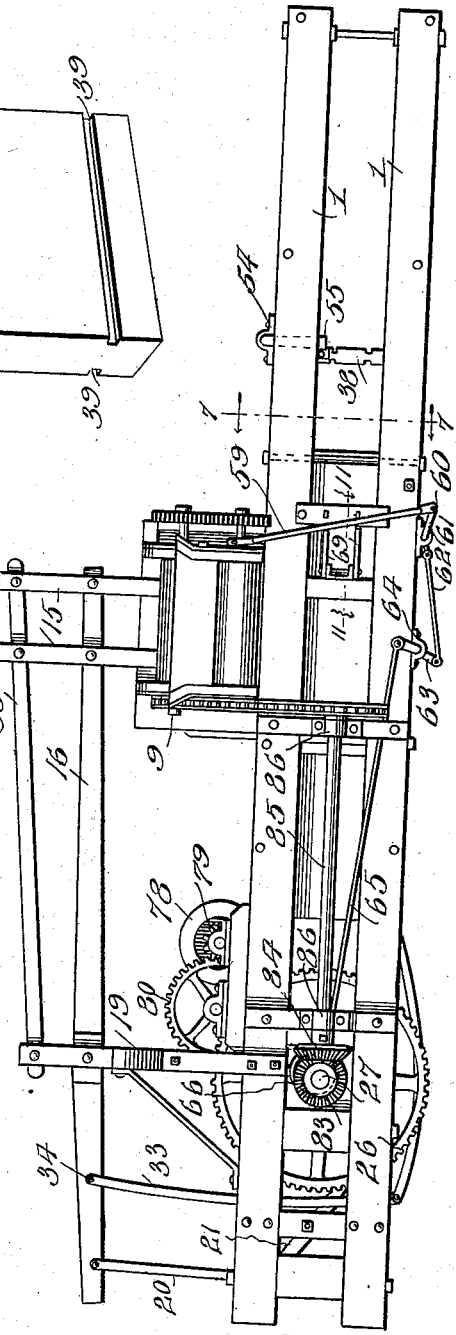
Witnesses
Frank Hough
Inventor
Gustave A. Rapp,
By Victor J. Evans
Attorney G. A. RAPP.
HAY PRESS.
APPLICATION FILED MAY 18, 1907.
900,588.
Patented Oct. 6, 1908.
3 SHEETS—SHEET 3.
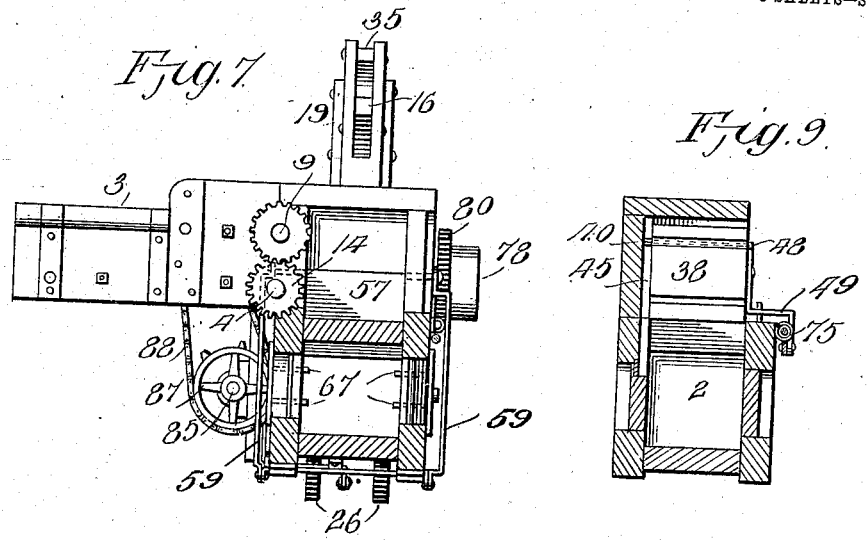
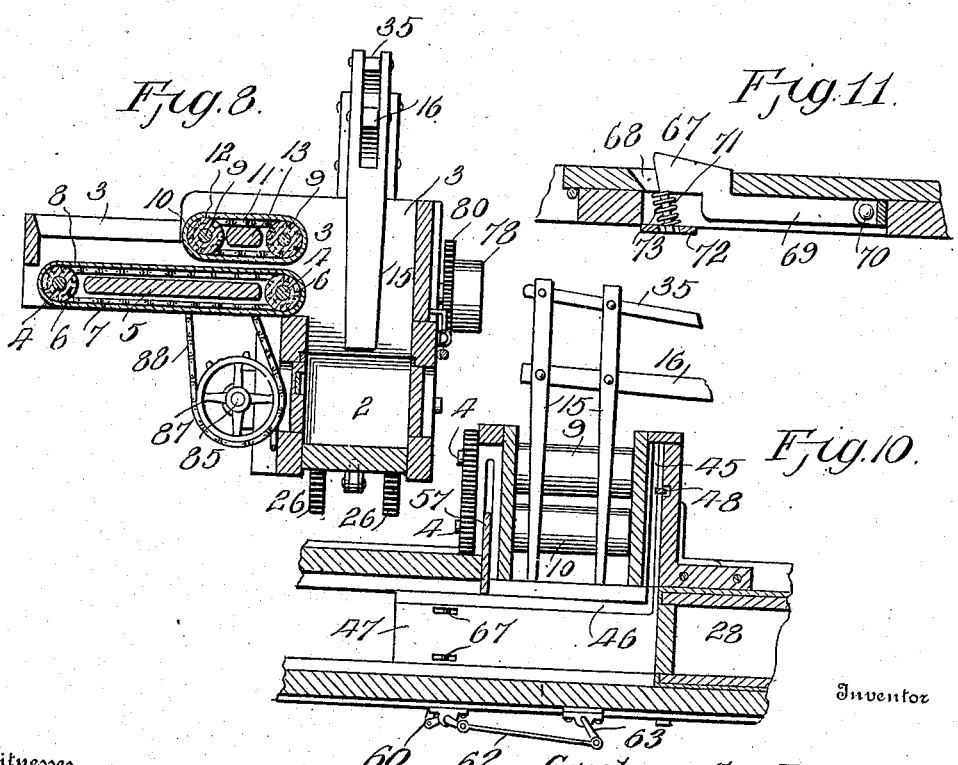
Witnesses
Frank Hough
Inventor
Gustave A. Rapp,
By Victor J. Evans
Attorney

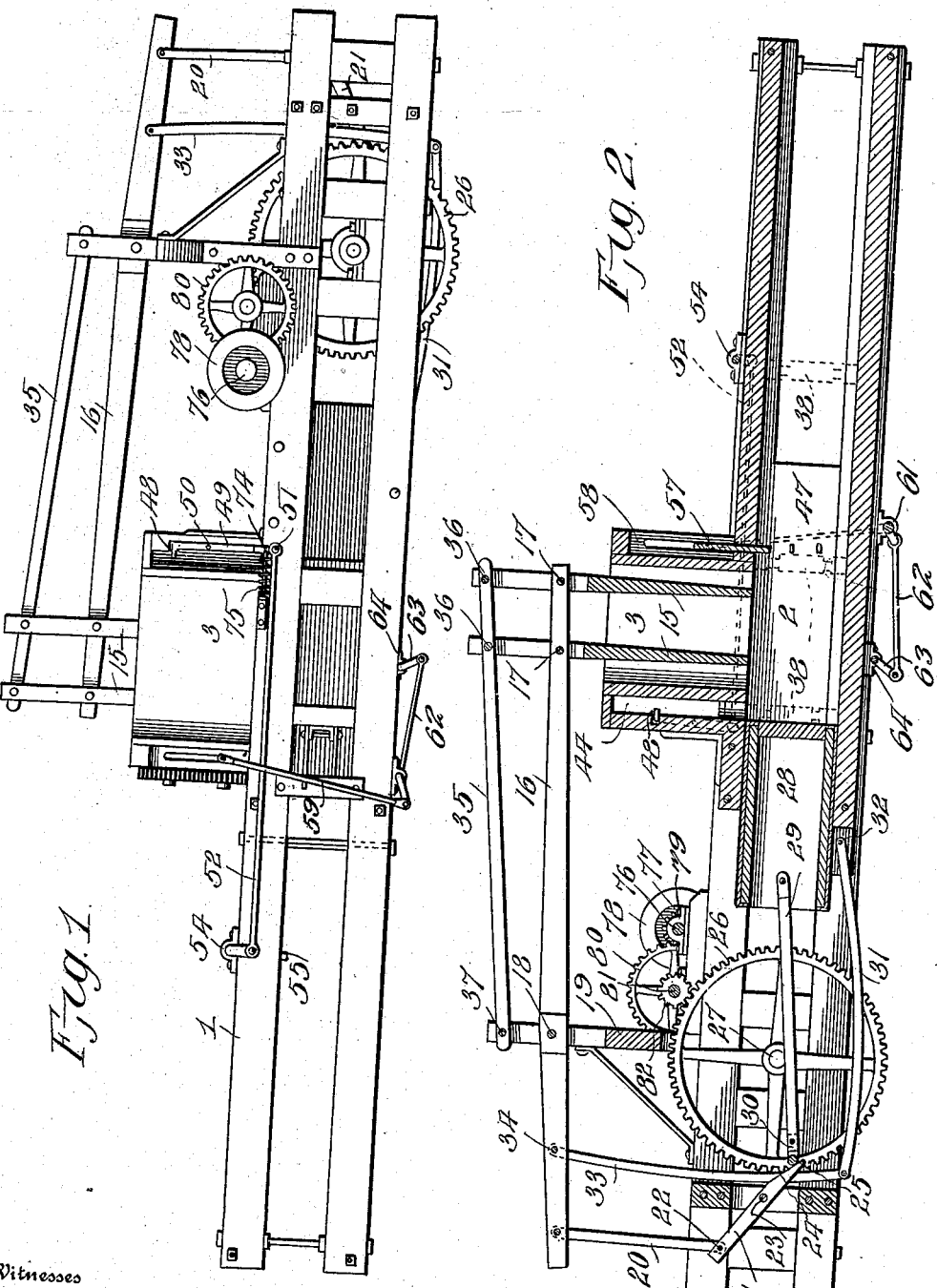

UNITED STATES PATENT OFFICE.

GUSTAVE A. RAPP, OF FORT COLLINS, COLORADO.

HAY-PRESS.

No. 900,588.   Specification of Letters Patent.   Patented Oct. 6, 1908.

Application filed May 18, 1907. Serial No. 374,319.

*To all whom it may concern:*

Be it known that I, GUSTAVE A. RAPP, a citizen of the United States of America, residing at Fort Collins, in the county of Larimer and State of Colorado, have invented new and useful Improvements in Hay - Presses, of which the following is a specification.

This invention relates to hay presses, and one of the principal objects of the same is to provide improved means for feeding the hay into the press box by means of endless carriers.

Another object of the invention is to provide means for automatically dropping the end blocks in front of the plunger.

Still another object of the invention is to provide vertically reciprocating folders for carrying the hay from the feeding devices down into the press box, and means for operating said folders at the time when the plunger is withdrawn from the press box.

These and other objects may be attained by means of the construction illustrated in the accompanying drawings, in which:

Figure 1 is a side elevation of the hay press made in accordance with my invention. Fig. 2 is a longitudinal section of the same. Fig. 3 is a plan view of the same. Fig. 4 is a side elevation looking at the side opposite that shown in Fig. 1. Fig. 5 is a perspective view of one of the end blocks. Fig. 6 is a detail section showing the spring projected pin in the end block. Fig. 7 is a transverse vertical section on the line 7—7, of Fig. 4. Fig. 8 is a similar view on the line 8—8, of Fig. 3. Fig. 9 is a transverse vertical sectional view on the line 9—9, of Fig. 3. Fig. 10 is a longitudinal sectional view on the line 10—10, of Fig. 3. Fig. 11 is a detail longitudinal section on the line 11—11, of Fig. 4.

Referring to the drawings for a more particular description of my invention, the numeral 1 designates the longitudinal timbers forming the guides for the plunger and for the bales, and also serving as the framework for mounting the mechanism thereon, and providing a press box 2.

The feeding mechanism comprises a feed box 3 which extends laterally outward from the frame in alinement with the press box 2. Journaled in the feed box 3 is a pair of shafts 4, and disposed intermediately between the shafts is a supporting board or platform 5. Secured to the shafts 4 inside the feed box are the sprocket wheels 6, and a sprocket chain 7 engages the sprocket wheels 6. Mounted on the shafts 4 between each pair of sprocket wheels 6 is a roller and mounted on said rollers over the sprocket chains 6 is an endless belt or apron 8. Two shafts 9 also journaled in the feed box 3 carry similar rollers and sprocket wheels 10 around which a sprocket chain 11 passes and an endless belt or apron 12 surrounds the rollers and covers the sprocket chain, a transverse platform or table 13 being disposed between the shafts and intermediate the upper and lower stretch of the drive chain 11, as shown more particularly in Fig. 3. The shafts 4 and 9 are rotated by the intermeshing gears 14 on the ends of said shafts. The endless belts or aprons 8 and 11 move inwardly toward the press box 2 and the hay is thrown on top of the apron or belt 8 and conveyed between said belt and the belt or apron 11 where the hay is compressed before it is delivered into the press box, the platforms 5 and 13 preventing the apron from pressure outward beyond the required degree.

The folding devices for carrying the hay from the feed box into the press box consist of a pair of folding arms 15, said arms being mounted upon a lever 16 by pivot pins 17. The lever 16 is pivoted at 18 upon an upright 19 rising from the frame timbers 1, and connected to the outer end of the lever 16 is a link 20 carrying a lever 21 pivotally connected at 22 to the lower end of said link, and said lever being pivoted at 23 to the frame of the machine and provided with a beveled projecting end 24 which is engaged by a cross bar or connecting pin 25 which extends between the crown gear wheels 26 mounted on a shaft 27 journaled in the frame. The plunger 28 has connected to it a connecting rod 29 which is pivoted by means of a strap 30 connected to the cross bar or pin 25. As the plunger 28 recedes from and moves out of the press box 2, the cross bar 25 is carried against the beveled portion 24 of the lever 21 which raises the link 20 and forces the folding arms 15 downward into the press box 2. After the cross bar or pin 25 passes the lever 21 it comes into contact with a curved connecting bar 31 pivoted at 32 to the frame, and having connected at its opposite end a curved bar 33, the upper end of which is pivotally connected at 34 to the lever 16. When the cross bar 25 bears downward upon the curved connecting bar 31, it pulls downward upon the bar 33, and thus causing the folding arms 15 to ascend. To hold the folding arms in a substantially vertical position, a bar 35 is pivotally connected at 36 to the upper ends of the arms 15, and the opposite end of said bar 35 being pivoted at 37 to the upper end of the upright 19.

The end block 38 is provided with side grooves 39 for the bale wires, and projecting from one edge of the block 38 is a pin 40, said pin being provided with a head 41, and a spring 42 mounted in an opening in the block 38 bears at one end against the head 41 of the pin, the opposite end of said spring bearing on the bottom wall of the opening or socket.
The pin 40 projects through an opening in a plate 43 secured flush with the edge of the block 38. The block 38 is fitted in a guide chamber 44 at one side of the feed box 3 with the pin 40 engaging a groove 45 in the end wall of the chamber, said groove 45 extending down through the bottom, and communicating with a groove 46 formed in the side wall 47 of the guideway for the plunger 28. The end block 38 is supported in the chamber 44 by means of a lug 48 projecting inward from a lever 49 pivoted at 50 in the chamber 44, the lower end of said lever being pivotally connected at 51 to a connecting rod 52, the opposite end of said connecting rod being connected to the cranked portion of a rock shaft 53 journaled in brackets 54 on the timbers 1. The rock shaft 52 is provided with a downwardly extending lug 55 which passes through a slot 56 at one side of one of the timbers 1.

A sliding stop board 57 is mounted to slide in a guideway formed in the uprights 58 at the opposite side of the feed box from the chamber 44. Connected at one edge of the board 57 is a connecting rod 59, the lower end of which is pivoted at 60 to a crank 61 to one end of which is connected a rod 62, and the opposite end of said rod 62 is connected to a crank 63 mounted in a bracket 64. Connected to the crank 63 is an eccentric rod 65 provided with an eccentric strap 66 which surrounds the shaft 27, by means of which the board 57 is lowered to support the end block 38 and raised to permit said block to pass out until the pin 40 comes in contact with the lug 55, at which time the connecting rod 52 and the lever 49 are operated to withdraw the lug 48 from the grooves 39 in the block 38, thus dropping the block to the position shown at the left of Fig. 2. In the side wall 47 of the guide, a pair of beveled dogs 67 project through an opening 68, said dogs being formed upon levers 69 pivoted at 70, and provided with a projecting stud 71, which projects through a perforated plate 72 secured on the outer side of the guide 47, a spring 73 being interposed between the plate 72 and the dogs 67, said spring surrounding the stud 71. These dogs serve to bear against one of the side edges of the block 38 to hold the same in position during the pressing operation, after which the block slides up the inclined beveled surface of the dogs and moves forward after the board 57 has been raised. A bolt 74 projected by a spring 75 bears against the lever 49 to throw the lug 48 inward after said lug has been withdrawn by means of the connecting rod 52 and the stud 55.

A drive shaft 76 is journaled in brackets 77 supported upon the timbers 1, said shaft carrying a belt pulley 78, and having connected thereto a pinion 79 which meshes with a gear wheel 80 on a shaft 81 journaled in brackets on the timbers 1, said shaft having secured thereto pinions 82 which mesh with the large gear wheels 26. On the shaft 27 is a beveled gear 83 which meshes with a similar gear 84 mounted on the end of a shaft 85 journaled in brackets 86 on the frame, and carrying at its end a sprocket wheel 87 around which a sprocket chain 88 passes, said chain passing around a sprocket wheel on the end of one of the shafts 9.

The operation of my invention may be briefly described as follows: Hay is thrown upon the belt or apron 8, and is carried by said belt underneath the apron or belt 11 where the hay is compacted or pressed and deposited into the press box 2, by means of the folding arms 15. It will be understood that an end block 38 is first placed in the position shown at the right hand side of the press box 2, in Fig. 2. As the plunger 28 moves forward to compress the hay, the cross bar 25 comes into contact with the lever 21 and depresses the folding arms 15. After the cross bar 25 has passed the lever 21 it comes in contact with the curved bar 31, and by pressing said bar downward, the bar 32 is pulled downward to raise the folding arms 15 out of the press box. Then the plunger 28 is fed forward, the end block 38 being dropped down in front of the plunger when the lug 48 is withdrawn from the groove 39 in the block by the forward movement of the previous bale striking against the lug 55, and the board 57 being raised to permit the bale to be discharged between the timbers 1.

From the foregoing it will be obvious that a hay press made in accordance with my invention will operate continuously, the various parts being timed in their movements to operate upon the bales and discharge them continuously.

Having thus described the invention, what I claim is:

1. In a hay press, the combination of a press box, a reciprocating plunger moving in said box, a folding lever, folding arms connected to said lever and adapted to fold the hay in the press box, a curved bar pivoted to the frame, a curved connecting bar attached to said curved bar and connected to said lever, a lever having a beveled end, a connecting rod connecting said levers, a revolving pin for bearing against said beveled end to operate the folding lever in one direction and against the curved bar to operate the folding lever in the other direction, and feeding mechanism comprising two horizontally disposed endless aprons spaced apart to press the hay between them, said aprons being located at one side of the top of the press box, the lower apron being longer than the upper one.

2. In a hay press, the combination of a press box, a reciprocating plunger, folding arms, means to reciprocate said arms, an end block dropping mechanism comprising a lever having a lug to engage the end block, and means for releasing the lug from the end block during the forward movement of the plunger.

3. In a hay press, the combination of a press box, a feed box, means for feeding the hay from the feed box into the press box, means for folding the hay in the press box, an end block chamber, a lever having a lug projecting into the chamber to engage the end block, and means for withdrawing the lug during the forward movement of the plunger.

4. In a hay press, the combination of an end block having a spring projected pin, a press box, a feed box having a grooved wall to engage said pin, a lever having a lug to engage said end block, and means for withdrawing the lug from the end block to permit the block to drop during the forward movement of the plunger.

In testimony whereof, I affix my signature in presence of two witnesses.

GUSTAVE A. RAPP.

Witnesses:
GEO. A. CARLSON,
M. M. ST. CLAIR.